Figure 1:
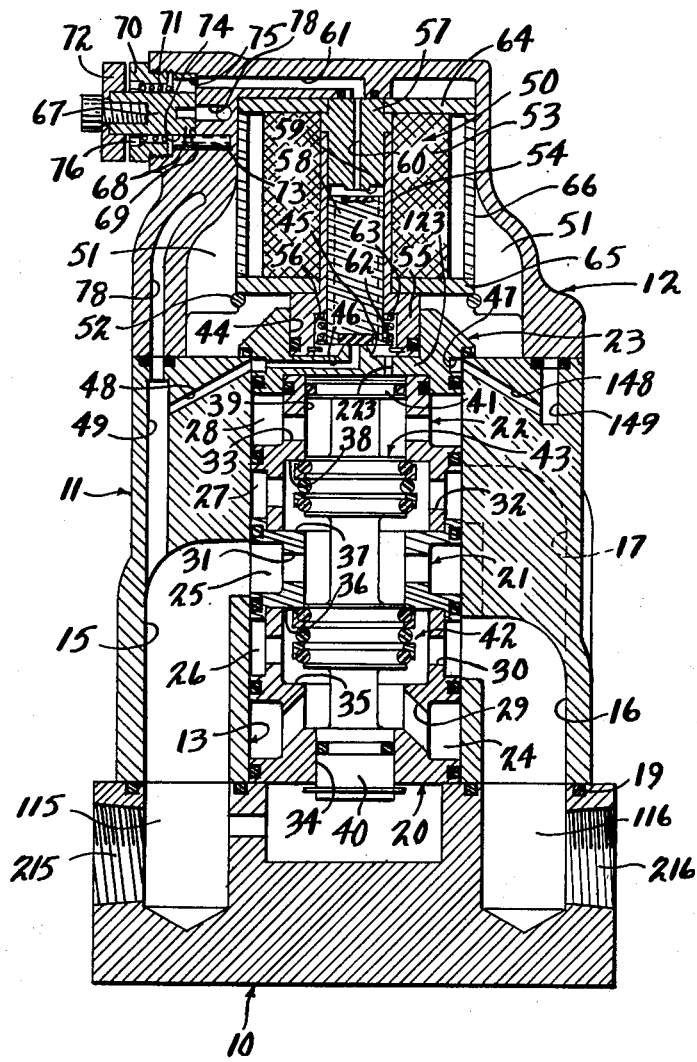

INVENTOR.
NATHAN C. HUNT

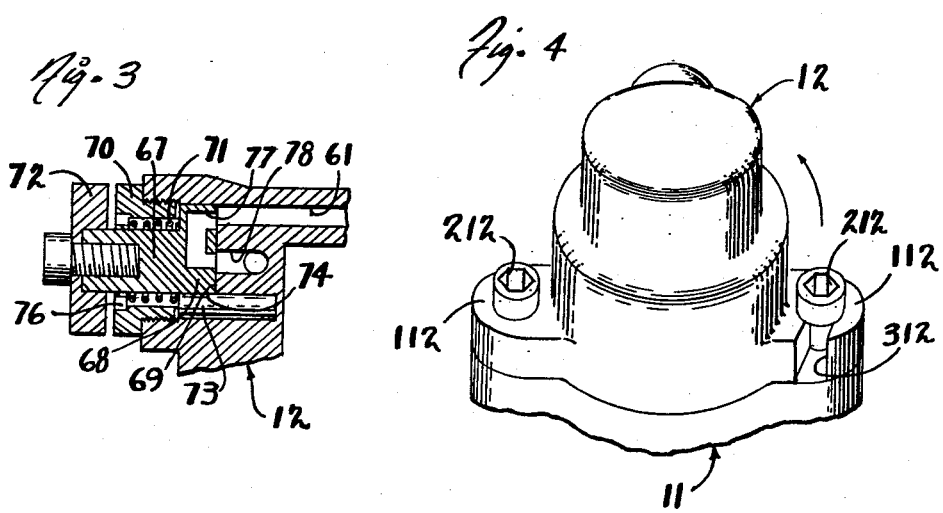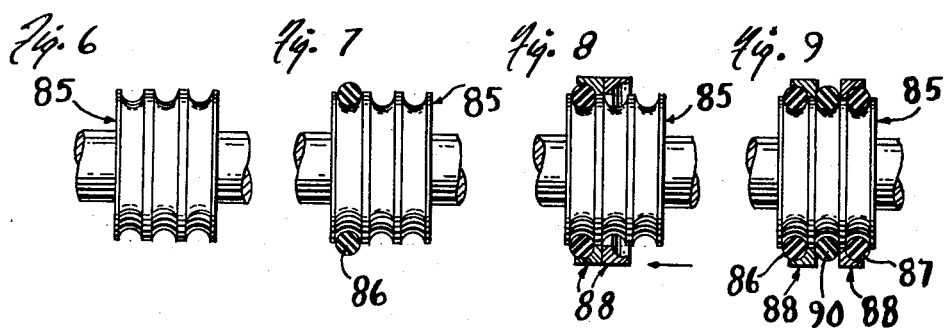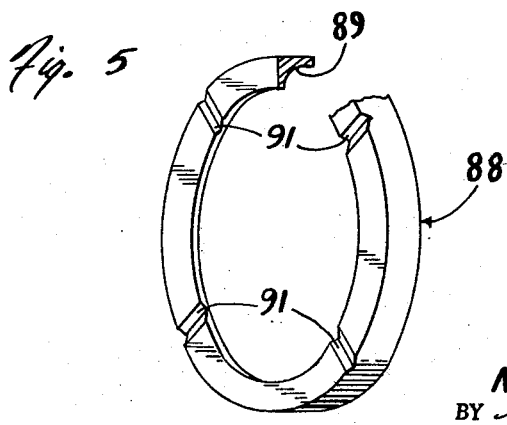

United States Patent Office 3,126,915
Patented Mar. 31, 1964

---

3,126,915
FLUID CONTROL VALVE
Nathan C. Hunt, Ocean Ridge, Delray Beach, Fla., assignor to International Basic Economy Corporation, New York, N.Y.
Filed Nov. 22, 1960, Ser. No. 71,103
6 Claims. (Cl. 137—625.5)

The present invention relates to valves for controlling flow of pressurized fluid, more particularly to valves which are adapted to be remotely controlled by electrical energy, and the principal object of the invention is to provide new and improved valves of the character described. This application is a continuation-in-part of my application of the same title, Serial Number 825,768, filed July 8, 1959, now abandoned.

Modern automated production equipment has created a need for fluid control valves which are simple and trouble-free in operation; which can readily be dismantled in the field and their wearing parts replaced or repaired in minimum time without special tools or highly skilled technicans; and which are rapid and positive in operation and with minimum resistance to fluid flow therethrough. The present invention provides a valve having to a high degree the above characteristics and also having other highly desirable characteristics as will later appear from a study of the following description.

Figure 2:
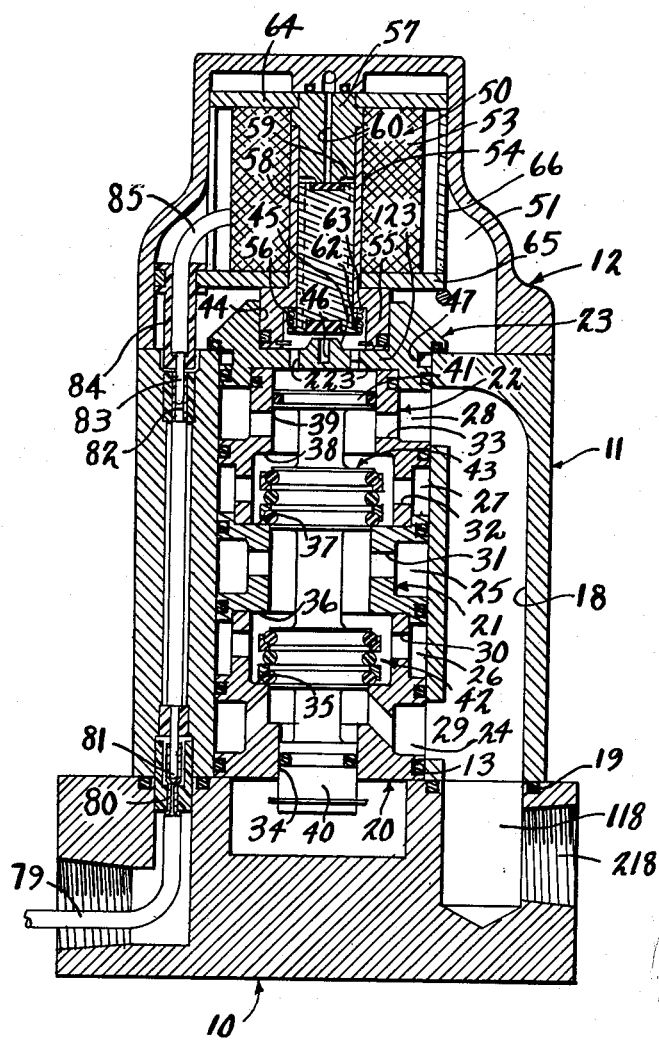

In the drawings accompanying this specification and forming a part of this application there is shown, for purpose of illustration, an embodiment which the invention may assume, and in such drawings:

FIGURE 1 is a sectional view taken through one embodiment of a valve constructed in accordance with the present invention, FIGURE 2 is a view similar to FIGURE 1 but taken through the valve along a different plane to show other facets of the valve construction and illustrating certain valve parts in another position of operation, FIGURE 3 is an enlarged, fragmentary sectional view of a part of the valve seen in FIGURE 1, certain parts being shown in another position, FIGURE 4 is a reduced size, fragmentary perspective view of certain details, FIGURE 5 is an enlarged, broken perspective view of a detail, and FIGURES 6 through 9 are enlarged fragmentary sectional views illustrating step-by-step assembly of certain valve parts.

Referring to FIGURE 1, the valve in this embodiment comprises three principal sections; a base 10 main body 11, and a cap 12 suitably secured together. At the present time, capscrews extend through aligned apertures in the cap and main body and are threaded into the base for removably securing the three valve sections together. As best seen in FIGURE 4, cap 12 has a pair of lugs 112 extending from opposed sides thereof and through which pass the shanks of capscrews 212. In order to provide for ready assembly and disassembly of the cap from the main body 11 of the valve, each cap lug 112 is slotted at 312 to pass a capscrew shank. Accordingly, to disengage the cap 12 from the main body, it is only necessary to slightly loosen the capscrews 212 and to then rotate the cap in the direction of the arrow to disengage the cap lugs from beneath the capscrew heads. The cap may then readily be lifted from the main body 11.

Briefly, base 10 contains various fluid passages and provides means by which the usual fluid and electrical connections may be made to the valve; main body 11 contains the relatively shiftable valve parts which control fluid flow toward and/or away from the apparatus with which the valve is associated; and cap 12 contains the electrically responsive mechanism which controls operation of the shiftable valve parts aforesaid of the main body portion.

To begin with the main body portion 11, the latter has a central bore 13 extending therethrough. Spaced radially about bore 13 are a plurality of fluid chambers 15, 16, 17 and 18 (the latter being seen in FIGURE 2) which are open to the bottom face of the main body portion and which are in communication with various axially spaced portions of the bore 13. With the main body portion 11 seated as seen in FIGURES 1 and 2 on the base 10, the fluid chambers 15 through 18 aforesaid align with respective passages in the base having the same reference characters but prefixed with the numeral "1." These base passages communicate with respective internally threaded valve ports also having the same reference characters but prefixed with the numeral "2." In order to prevent fluid leakage between the abutted lower face of main body 11 and the upper face of base 10, a suitable gasket 19 may be interposed. Such gasket will preferably be circular in cross-section, as herein illustrated, and will be embedded in the upper face of base 10 for engagement with the lower face of main body 11.

Slidably fitting within bore 13 of main body 11 are a plurality of sleeve-like members in end-to-end relation. In the present embodiment, three such members are disclosed: a lower member 20, an intermediate member 21, and an upper member 22. Abutting upper member 22 and closing the top of bore 13 is a disk member 23 later to be described in greater detail. Lower member 20 and intermediate member 21 have respective annular peripheral grooves which provide with the bore 13 respective annular recesses 24, 25 for a purpose to appear. Moreover, the construction of these two members is such that an annular peripheral recess 26 is provided therebetween.

Members 21 and 22 also cooperate to provide an annular peripheral recess 27 therebetween while member 22 and disk 23 cooperate to provide an annular peripheral recess 28. Lower member 20 has transverse apertures 29 and 30 which place its interior in communication with respective recesses 24, 26; member 21 has transverse apertures 31 which place its interior in communication with annular recess 25; and member 22 has transverse apertures 32 and 33 which place its interior in communication with respective recesses 27, 28. A plurality of O sealing rings are carried by the members 20, 21, 22 and disk 23 and are engageable with the bore 13 to prevent leakage along the bore wall between the annular recesses aforesaid. Other sealing rings prevent fluid leakage between the member 22 and the disk 23 and between the latter and the main body 11 as will be evident.

For purposes to appear, lower member 20 is provided with a bore 34 and such member also provides a valve seat 35 in spaced, facing relation with a valve seat 36 formed in the intermediate member 21. The last mentioned member also provides a valve seat 37 in spaced facing relation with a valve seat 38 formed in the upper member 22. Upper member 22 also provides a bore 39 which, in the present embodiment, has twice the transverse area of lower member bore 34 for a purpose to be disclosed.

Movable axially within the sleeve members aforesaid is a valve spool having a lower plunger portion 40 slidably fitting within bore 34 of the lower member 20, an upper piston portion 41 slidably fitting within bore 39 of upper member 22, and axially spaced, intermediate valve heads 42, 43 reciprocable between respective valve seat pairs 35, 36 and 37, 38. In the position of parts as seen in FIGURE 1, valve head 42 is engaged with seat 36 and disengaged from seat 35, and valve head 43 is engaged with seat 38 and disengaged from seat 37. The novel construction of valve heads 42, 43 will later be described in detail.

Turning now to the previously mentioned disk member 23, the latter has a transverse wall 123 which closes the upper end of the bore 39 of the member 22. For a purpose to be seen, such wall is apertured at 223. The upper portion of disk 23 has a downwardly extending recess 44 having a central, upstanding valve seat 45 in its bottom. A passage 46 leads from the valve seat 45 to an annular groove 47 formed in the disk member. Such groove is in communication through a conduit 48 with an upstanding fluid passage 49 formed in the main body. In the present embodiment, the lower end of conduit 49 is in communication with the previously mentioned fluid chamber 15. In diametrically opposed relation to conduits 48, 49 are similar conduits 148, 149 whose function will appear.

Considering next the valve cap portion 12, the latter has a downwardly facing recess in which is seated a solenoid assembly 50. Since the lower portion of the cap is radially enlarged, its interior is provided with ribs 51 which locate and confine the lower portion of the solenoid assembly. A suitable retaining member 52 is seated in a groove in the cap to removably retain the solenoid assembly 50 assembled with the cap.

Solenoid assembly 50 comprises a solenoid coil 53 which surrounds a dielectric sleeve 54. For a purpose to appear the lower end of sleeve 54 has a radial enlargement 55 which closely fits within the recess 44 of the disk 23 and provides a downwardly facing recess 56. Disposed within sleeve 54 is a two piece solenoid core of magnetically permeable material. The upper core portion 57 is press fitted within or is otherwise fixed to the sleeve while the lower core portion 58 is slidable therewithin toward and away from the upper core portion. The lower end of the upper core portion is provided with a central, depending valve seat 59 and with a longitudinally extending fluid passage 60 which communicates with a transverse fluid passage 61 in the cap. In order to provide for free fluid flow about the lower core portion 58, the latter has a fluted exterior.

The lower end of core portion 58 provides a radially extending shoulder 62 and a coil spring 63 is interposed between this shoulder and the sleeve 54 to resiliently urge the lower core portion to the lowermost position seen in FIGURE 1. Both the upper and lower ends of the lower core portion 58 are provided with resilient inserts of rubber or the like for sealing engagement with respective seats 45, 59 respectively provided by the disk member 23 and the upper core portion 57. Completing the solenoid assembly is an upper flux washer 64, a lower flux washer 65, and a flux sleeve 66. The latter is preferably split longitudinally so that it may be sprung into the cap and also for another purpose to appear.

Carried by the cap 12 is a manually operable override control which may be employed to control valve operation independently of solenoid energization. Such control is seen in one position in FIGURE 1 and in another in FIGURE 3. This control is herein shown to comprise a valve member having a stem portion 67 with a radially enlarged head portion 68. At least the head portion of this valve member is preferably made of a suitable plastic material to provide for its fluid-tight engagement with the bottom of a counterbore 69 formed in the cap. A threaded plug 70 retains the valve member in position and a spring 71 urges the head 68 to seated relation in its counterbore. Stem 67 of the valve member projects outwardly of the plug through an aperture formed therein and the projecting shank end has an actuating knob 72 secured thereto. In order to limit rotation of the valve member, a pin 73 is anchored in the cap within the counterbore 69 and the valve member head is cut away at 74 to clear such pin. It is to be understood that the circumferential length of the cutaway head portion determines the amount that the valve member may be rotated.

As seen in FIGURE 1, valve member head 68 is provided with a through aperture 75 which, in the position of parts shown, aligns with the fluid passage 61 in the cap. Such aperture places the aforesaid passage 61 in communication with the atmosphere through apertures 76 in the plug 70.

Valve member head 68 also has a U-shaped passage 77 which, in the position of parts seen in FIGURE 3, establishes communication between the aforesaid cap passage 61 and another passage 78 whose one end terminates centrally of and at the bottom of counterbore 69. The opposite end of passage 78 terminates at the lower face of the cap in alignment with the previously mentioned passage 49 in the main body. It might be mentioned at this point that in the event it is desired to so position cap 12 on the main body that the over-ride control will be at the right rather than at the left, passage 78 will align with main body passage 149 rather than with 49 as herein illustrated. However, passage 78 will remain in communication with passage 49 because of the interconnection between the latter and passage 149.

Turning now to FIGURE 2, it will be noted that the valve herein disclosed is of the plug-in type wherein electrical circuit connections for the solenoid coil are automatically made between the various valve parts upon assembly of the latter. To this end, the electrical leads 79 which convey electrical energy to the solenoid coil 53 are led into the base 10 through a suitable recess and terminate in socket members 80 adjacent the upper face of the base. Suitable plug members 81 are carried by main body 11 adjacent its lower face and plug into respective sockets upon assembly of the main body with the base. Plug members 81 are electrically connected with socket members 82 adjacent the upper face of the main body and such socket members are adapted to receive suitable plug members 83 carried by an insulator body 84 anchored to the lower flux washer 65 of the solenoid. Plug members 83 are electrically connected with the solenoid coil 53 by means of leads 85 which pass through the aforementioned, longitudinal split in the flux sleeve 66.

As previously mentioned, the valve spool contained within the main body 11 has a pair of axially spaced valve heads 42, 43. Since these heads are identical, a description of one will suffice for both. Briefly, each head comprises a radial enlargement having a pair of resilient faces engageable with respective valve seats. At the present time, it is preferable to employ O sealing rings for the resilient faces.

Turning now to FIGURE 6, each valve spool head is provided by a radially enlarged portion 85 having three annular grooves in its periphery. The diameter of such enlarged portion is such that it will slidably pass through those reduced diameter portions of members 20, 21 and 22 adjacent their valve seats. As best viewed in FIGURE 9, the outermost grooves are adapted to receive respective O sealing rings 86, 87 which provide the resilient faces for engagement with the valve seats. Means are provided for retaining such rings in position against displacement as the valve head is forceably held against its seat. At the present time, such means comprises axially spaced, annular retainer members 88 each having an annular lip 89 for overlying the outer periphery of a respective ring to prevent radial expansion thereof and consequent displacement from its groove. A third O ring 90 is seated in the center groove and holds the retainers in the proper space relation in engagement with respective rings 86, 87.

Assembly of the O rings and retainers with the valve spool will be effected by first disposing one of the O rings, for example, ring 86, in its groove as shown in FIGURE 7. This is easily accomplished since such resilient rings may readily be stretched. The two annular retainer members will then be positioned in back to back relation as seen in FIGURE 8 by sliding them over the spool in the direction of the arrow. With the retainer members thus positioned, adequate clearance will be provided to permit the ring 87 to be disposed in its groove. The right-hand retainer member will then be slid to the right to the position seen in FIGURE 9 and the ring 90 then stretched over one of the retainers to seated relation in its grooves wherein it maintains the retainers in the spaced relation illustrated.

With reference to FIGURE 5, it is to be noted that each retainer member 88 has a plurality of radially extending grooves 91 formed in the face thereof which abuts ring 90. The function of grooves 91 is to ensure against the entrapment of fluid under pressure beneath the ring 90 which might force such ring out of its groove.

The aforesaid construction of the valve heads 42, 43 is highly advantageous for the following reasons. Manufacturing tolerances make it a virtual impossibility to maintain precisely the same spacing between, for example, the spaced seats 36, 38 and the seat-engaging faces of respective valve heads. Therefore, it is inevitable that one of the valve heads will engage its seat before the other. Were it not for the resilient nature of the seat-engaging faces of the valve heads, the valve head which first engages its seat would prevent seating of the other valve head and thus leakage of the valve would result. The manner in which the valve heads of the present invention accommodate manufacturing tolerances and/or wear will now be described with reference to FIGURE 1.

Assuming that the arrangement of parts is such that valve head 43 will engage its seat 38 prior to the engagement of valve head 42 with its seat 36, it is to be understood that as the uppermost O ring of valve head 43 engages seat 38, this ring will not only be compressed axially but it will also be moved axially relative to the valve member as the latter attempts to continue its upward movement despite the fact that the ring is seated in its groove. The axial movement aforesaid of the uppermost O ring will be resisted, however, by the resiliency of both the center and the lowermost O rings of head 43 since axial movement of the uppermost ring is transferred to the center ring by the uppermost retainer 88 and thence to the lowermost ring by the lowermost retainer 88. Accordingly, there is provided sufficient resilient overtravel of the head 43 to insure proper seating of the head 42 with its seat 36 despite the fact that head 43 might first engage with its seat 38. Obviously, since heads 42, 43 are identical, a similar action will take place in the event head 42 rather than head 43 first engages its seat. Also, a similar action will occur when the valve member is shifted to the position seen in FIGURE 2 wherein valve head 42 is engaged with seat 35 and valve head 43 is engaged with seat 37.

With reference to FIGURE 1 and assuming valve port 215 to be connected to a source of fluid pressure, assuming the other valve ports to be appropriately connected to the apparatus to be controlled, assuming the proper electrical connections have been made to the leads 79, and assuming the over-ride control to be positioned as illustrated in this figure, operation will be as follows: It is to be noted that the solenoid coil 53 is at this time de-energized; accordingly, spring 63 urges the lower core member 58 to its lowermost position wherein it is seated against valve seat 45 to block fluid flow therethrough and is spaced from valve seat 59 to permit free passage of fluid through passages 60, 61 to the atmosphere through the over-ride control.

Since the lower plunger portion 40 of the valve spool is exposed to inlet fluid pressure in a chamber formed in the base 10, such pressure will urge the valve spool upwardly to the position seen in FIGURE 1. Any fluid above the valve spool piston 41 will be vented to the atmosphere through the apertures 223 in the disk member, around the fluted lower core portion 58, past valve seat 59, and through passages 60, 61. With the valve spool thus positioned, it will be seen that valve spool head 42 is engaged with seat 36 to block flow of fluid between annular grooves 25, 26 but is disengaged from seat 35 to permit flow of fluid between annular grooves 26, 24. Similarly, valve spool head 43 is engaged with seat 38 to block flow of fluid between annular grooves 28, 27 but is disengaged from seat 37 to permit flow of fluid between annular grooves 27, 25.

If solenoid coil 53 is now energized, lower core portion 58 will be shifted by magnetic attraction against the urging of spring 63 from the position seen in FIGURE 1, to the position seen in FIGURE 2. This shifting of the lower core portion will prevent flow of fluid through valve seat 59 and will provide for fluid flow through valve seat 45. With fluid permitted to flow through valve seat 45, pressurized inlet fluid from chamber 15 will fill chamber 56 and exert a downward force on valve spool piston 41 by passing through the apertures 223 in the wall 123 of the disk 23. Since the area of piston 41 is double that of plunger 40 and since both are exposed to the same inlet fluid pressure, the piston will exert on the valve spool a resultant downward force equal to the resultant upward force previously exerted by the plunger. Accordingly, the valve spool will be urged downwardly to the position seen in FIGURE 2. In such position, valve spool head 42 is engaged with seat 35 to block flow of fluid between annular grooves 24, 26 but is disengaged from seat 35 to permit flow of fluid between annular grooves 25, 26. Similarly, head 43 is now engaged with seat 37 to block flow of fluid between annular grooves 25, 27 but is disengaged from seat 38 to permit flow of fluid between annular grooves 27, 28.

Upon de-energization of the solenoid coil 53, spring 63 will return the lower core portion 58 to the position seen in FIGURE 1. This will vent to the atmosphere the fluid above piston 41 and cut off inlet fluid pressure from such piston. Plunger 40, still being exposed to inlet fluid pressure, will therefore shift the valve spool to the position seen in FIGURE 1.

Under certain circumstances, it may be desirable to shift the valve spool from the position seen in FIGURE 1 to the position seen in FIGURE 2 without energizing the solenoid coil. Such circumstances might occur when, for example, it is necessary to adjust the apparatus with which the valve is associated. When the above requirement arises, it is only necessary to rotate the over-ride control valve member by means of actuating knob 72 from the position seen in FIGURE 1 to the position seen in FIGURE 3. Such positioning of the over-ride control will establish communication between passage 61 and passage 78 to thus permit inlet fluid to reach the top of valve spool piston 41 and thus shift such valve spool to the position seen in FIGURE 2. Return of the over-ride control to the position seen in FIGURE 1 will, of course, interrupt communication between passages 61, 78 and establish communication between passage 61 and the atmosphere to thus permit the valve spool plunger 40 to return the valve spool once again to the position seen in FIGURE 1.

Disassembly of the valve for inspection or maintenance may be effectuated literally in seconds. As before disclosed, the capscrews 212 will be slightly loosened and the cap then rotated a small amount. This will permit the cap to be lifted from the main body 11, the prongs 83 pulling out of their sockets 82 to automatically break the electrical connections to the solenoid coil. In the event the lower core portion 58 is to be removed, the snap ring at the mouth of recess 56 will be removed from its groove. If the entire solenoid assembly 50 is to be withdrawn from the cap, retaining member 52 will be removed from its seat.

Removal of the cap 12 will expose the disk member 23 and if the underlying valve spool is to be removed, the disk member 23 will be withdrawn from the bore 13. Upper member 22 will then be withdrawn from the bore thus exposing piston 41 so that it may readily be grasped. Withdrawal of piston 41 will withdraw the entire valve spool and consequently the members 20, 21 since a snap ring at the bottom of plunger portion 40 provides an abutment which engages beneath the member 20.

In the event the sealing faces of the valve plunger heads 42, 43 are to be replaced, the respective O rings may be removed by reversing the operations disclosed with respect to FIGURES 6 through 9 and new rings installed in their places. Note that removal of the member 21 from between the valve heads may readily be effected once valve head 43, for example, has been stripped of its O rings and retainers since the stripped head will then pass through the interior of the member. Reassembly of the disassembled valve parts will readily be effected by reversing the dismantling operations aforesaid.

It should be understood that while disassembly of the valve spool, the members 20, 21 and 22 and the parts which make up the valve heads has been described, this will not ordinarily be done when the valve is serviced in the field. In order to save time, a malfunctioning valve spool and sleeve member assembly will be removed as a unit and a new, or rebuilt unit, installed in its place. The defective assembly may then later be rebuilt at leisure if desired.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A valve construction having a housing providing a pair of spaced valve seats, a valve member reciprocable within said housing and having portions spaced-apart from each other in the direction of valve member movement, each portion being adjacent a respective valve seat and each providing a peripheral annular groove, a resilient toroidal sealing member seated in respective grooves and each providing a radially outwardly projecting annular shoulder movable with said valve member and engaged with respective adjoining valve seats to block flow of fluid therepast upon valve member movement in one direction and disengaged from such valve seats to provide for flow of fluid therepast upon valve member movement in the opposite direction, a pair of ring-like retainer members slidably fitting over respective valve member portions and each having an annular shoulder engaged with respective sealing members in opposed relation with respective valve seats and each also having an axially extending annular flange overlying and engaging the outer periphery of respective sealing members for retaining the latter against unintentional displacement from respective valve member grooves, and a toroidal member of resilient material abutting respective retainer members and yieldably urging the latter to engagement with respective sealing members, said toroidal members and said sealing members yielding in the direction of valve member movement upon engagement of said sealing members with respective seats to positively seal said seats against fluid movement therepast.

2. A valve construction comprising a housing having a bore formed therein, a pair of axially spaced valve seats within said bore, a valve member reciprocable axially within said bore and having a pair of axially spaced, annular peripheral grooves, a pair of first resilient annular members seated in respective valve member grooves and each providing a shoulder movable with said valve member toward and away from engagement with respective valve seats, a second resilient annular member removably carried by said valve member intermediate said first resilient members and in axially spaced relation therewith, and a pair of ring-like retainer members slidably carried by said valve member and each disposed intermediate said second resilient member and a respective one of said first resilient members, each retainer member having annular, axially extending portions adjacent the peripheries of respective adjoining resilient members to restrict radial outward movement thereof.

3. A valve construction having a housing providing a pair of spaced valve seats, a valve member reciprocable within said housing and having portions spaced-apart from each other in the direction of valve member movement with each valve member portion adjacent a respective valve seat, a resilient annular sealing member carried by respective valve member portions and each providing a radially outwardly projecting annular shoulder movable with said valve member and engaged with respective adjoining valve seats to block flow of fluid therepast upon valve member movement in one direction and disengagd from such valve seats to provide for fluid flow therepast upon valve member movement in the opposite direction, a pair of ring-like retainer members slidably fitting over respective valve member portions and each having an annular shoulder engaged with respective sealing members, and a resilient ring-like member of rubber-like material interposed between said retainer members to yieldably urge them to engagement with respective sealing members, said sealing members and said resilient member yielding in the direction of valve member movement upon engagement of said sealing members with respective seats to insure positive sealing engagement between said valve member and said seats.

4. The construction of claim 3 wherein said retainer members have axially extending portions engaging the outer peripheries of respective sealing members for restraining the latter against unintentional movement radially outwardly of said valve member.

5. A poppet valve comprising a pair of spaced-apart valve seats, a reciprocable valve member having a peripheral annular groove adjacent respective seats, resilient O ring sealing members seated in respective valve member grooves and each providing a radially outwardly projecting annular shoulder movable with said valve member toward and away from engagement with respective seats, a pair of axially spaced, ring-like retaining members slidably carried by said valve member intermediate said grooves and each positioned adjacent a respective O ring sealing member and engaging the outer periphery thereof to retain such member in its groove, and a resilient O ring spacer removably interposed between said retaining members and preventing movement thereof toward each other and away from respective O ring sealing members.

6. The construction of claim 5 wherein each retaining member has an axially extending annular flange overlying and engaging the periphery of a respective O ring sealing member and wherein each retaining member is provided with a radially extending groove adjacent said O ring spacer to provide for fluid flow therebetween and prevent displacement of said spacer by fluid pressure.

(References on following page)

References Cited in the file of this patent

UNITED STATES PATENTS

| | | |
|---|---|---|
| 1,172,833 | Ricker | Feb. 22, 1916 |
| 2,195,337 | MacLean | Mar. 26, 1940 |
| 2,372,311 | Brown | Mar. 27, 1945 |
| 2,417,494 | Hoof | Mar. 18, 1947 |
| 2,632,821 | Wright | Mar. 24, 1953 |
| 2,641,281 | Phillips | June 9, 1953 |
| 2,644,120 | Swanton | June 30, 1953 |
| 2,651,324 | Hodgson et al. | Sept. 28, 1953 |
| 2,672,887 | Tipton | Mar. 23, 1954 |
| 2,693,930 | Carter | Nov. 9, 1954 |
| 2,747,604 | Fraser | May 29, 1956 |
| 2,759,455 | Kind | Aug. 21, 1956 |
| 2,853,658 | Lindenberg | Sept. 23, 1958 |
| 2,861,594 | Collins | Nov. 25, 1958 |
| 2,886,063 | Ray | May 12, 1959 |
| 2,897,836 | Peters et al. | Aug. 4, 1959 |
| 2,910,091 | Weis | Oct. 27, 1959 |
| 2,935,092 | Stoner | May 30, 1960 |
| 3,008,488 | Vander Kaay et al. | Nov. 14, 1961 |
| 3,025,878 | Hupp | Mar. 20, 1962 |

UNITED STATES PATENT OFFICE
CERTIFICATE OF CORRECTION

Patent No. 3,126,915                March 31, 1964

Nathan C. Hunt

It is hereby certified that error appears in the above numbered patent requiring correction and that the said Letters Patent should read as corrected below.

Column 8, line 10, after "members" insert -- removably --.

Signed and sealed this 21st day of July 1964.

(SEAL)

Attest:

ESTON G. JOHNSON
Attesting Officer

EDWARD J. BRENNER
Commissioner of Patents